(12) United States Patent
Madeyski et al.

(10) Patent No.: US 8,756,082 B1
(45) Date of Patent: Jun. 17, 2014

(54) VIRTUOUS CYCLE BUSINESS GROWTH

(75) Inventors: Mark Madeyski, Lincolnshire, IL (US); Thomas Purtell, Deer Park, IL (US)

(73) Assignee: Allstate Insurance Company, Northbrook, IL (US)

( * ) Notice: Subject to any disclaimer, the term of this patent is extended or adjusted under 35 U.S.C. 154(b) by 194 days.

(21) Appl. No.: 12/572,922

(22) Filed: Oct. 2, 2009

Related U.S. Application Data

(60) Provisional application No. 61/117,798, filed on Nov. 25, 2008.

(51) Int. Cl.
- *G06Q 30/02* (2012.01)
- *G06Q 40/00* (2012.01)
- *G06Q 10/10* (2012.01)

(52) U.S. Cl.
CPC ............... *G06Q 30/02* (2013.01); *G06Q 40/00* (2013.01); *G06Q 10/1091* (2013.01)
USPC ................................................ 705/4; 705/37

(58) Field of Classification Search
None
See application file for complete search history.

(56) References Cited

U.S. PATENT DOCUMENTS

| | | | |
|---|---|---|---|
| 5,621,201 | A | 4/1997 | Langhans |
| 7,319,986 | B2 * | 1/2008 | Praisner et al. ................. 705/39 |
| 7,566,999 | B2 | 7/2009 | Agostino et al. |
| 7,783,566 | B2 * | 8/2010 | Armes et al. .................... 705/40 |
| 2002/0035506 | A1 | 3/2002 | Loya |
| 2002/0049806 | A1 * | 4/2002 | Gatz et al. ..................... 709/203 |
| 2002/0095386 | A1 * | 7/2002 | Maritzen et al. ................ 705/64 |
| 2003/0026404 | A1 * | 2/2003 | Joyce et al. ............... 379/144.01 |
| 2003/0182187 | A1 | 9/2003 | Scoble |
| 2003/0212629 | A1 | 11/2003 | King |
| 2004/0122726 | A1 * | 6/2004 | Linde et al. ..................... 705/10 |
| 2004/0128243 | A1 * | 7/2004 | Kavanagh et al. .............. 705/39 |
| 2004/0210531 | A1 * | 10/2004 | Barron et al. ................... 705/44 |
| 2004/0249745 | A1 * | 12/2004 | Baaren ............................ 705/39 |
| 2005/0027551 | A1 | 2/2005 | Mayer et al. |
| 2005/0222904 | A1 | 10/2005 | Cotton |
| 2006/0229890 | A1 | 10/2006 | Sattler et al. |
| 2007/0094088 | A1 * | 4/2007 | Mastie et al. ................... 705/24 |
| 2007/0124238 | A1 * | 5/2007 | Hogg et al. ..................... 705/38 |

(Continued)

FOREIGN PATENT DOCUMENTS

WO 2004100094 11/2004

OTHER PUBLICATIONS

Integra Personnel serves the Greater Seattle, and Puget Sound areas of Washington Copyright © 2000-2002 Integra Personnel, Inc., All Rights Reserved Worldwide Produced and Promoted by XyNexT Internet Strategies—Kirkland, Washington 98033 @integrapersonnel.cc/help-insurance-positions.htm.*

(Continued)

*Primary Examiner* — Kirsten Apple
*Assistant Examiner* — Mary Gregg
(74) *Attorney, Agent, or Firm* — Banner & Witcoff, Ltd.

(57) ABSTRACT

Systems and methods are disclosed that allow an insurance company to provide awards to its agents in a manner that encourages the agents to purchase goods and services that will assist the agents in growing, branding, and/or managing his or her business. Computer systems are programmed with computer-executable instructions to determine an allocation of funds to be granted to an agent and to limit the use of the funds to goods and services identified as assisting the agent in the growth, branding, or management of his or her business.

20 Claims, 5 Drawing Sheets

(56) References Cited

U.S. PATENT DOCUMENTS

| | | | |
|---|---|---|---|
| 2007/0174113 | A1 | 7/2007 | Rowen |
| 2007/0250382 | A1* | 10/2007 | Beck .............................. 705/14 |
| 2007/0288340 | A1 | 12/2007 | Kravitz |
| 2007/0299755 | A1 | 12/2007 | Carr |
| 2008/0027860 | A1* | 1/2008 | Mullen et al. .................. 705/39 |
| 2008/0162487 | A1* | 7/2008 | Richter ........................... 707/10 |
| 2008/0319868 | A1 | 12/2008 | Briscoe et al. |
| 2009/0006163 | A1 | 1/2009 | Subramanian et al. |
| 2009/0157489 | A1 | 6/2009 | Leman |

OTHER PUBLICATIONS

TopTenReviews by insurance-quoteOreview.toptenreviews.com/auto-insurance/; 5 pages; Aug. 10, 2009.*

Upgrade your membership to AAA Premier or AAA Plus and experience our highest level of benefits by AAA.*

Research Report: Divisional Performance Measurement: An Examination of the Potential Explanatory Factors; by Drury et al.; 65 pages. Mar. 2005; the chartered Institutionof management accountants.*

Commercial Card Solutions, <http://www.commercebank.com/pdfs/3CommCardSolW0607.pdf>.

Corporate Procurement Card, <http://wwwnew.towson.edu/adminfinance/fiscalplanning/procurement/documents/CorporateProcurementCard2006120606.pdf>.

JSA/Jefferson Lab Purchase Card Handbook, <http://www.jlab.org/div_dept/admin/business/pcard/JSA_Jefferson%20Lab%20Purchase%20Card%20Handbook%20Feb%202008.pdf>.

Quiznos Launches Gift Card, Incentive Card Program, < http://promomagazine.com/incentives/news/quiznos_giftcard_110106/>.

Restricted Credit Cards, <http://www.docuverse.com/blog/donpark/2003/11/05/restricted-credit-cards>.

"TransCard Debuts Corporate Gift Card Site." Wireless News Nov. 23, 2008 (1 page).

JPMorganChase "Purchasing Card Program Overview; CICU & Member Schools" Apr. 12, 2006 (28 pages).

Fickenscher, Lisa. "AMEX Prepaid Offering is Latest Card for Firms Rewarding Employees Series: 13". American Banker (pre- 1997 Fulltext). New York, N.Y.: Aug. 8, 1996. vol. 161, Iss. 151; p. 11. (2 pages).

Office Action from U.S. Appl. No. 12/572,931, mailed Jan. 18, 2012.

Office Action from U.S. Appl. No. 12/572,931 mailed Jun. 12, 2012.

Bank of America: Higher Standards, Oct. 12, 2006 <http://www.doa.state.nc.us/pandc/BOAuseroverview.pdf>.

Procurement Card Program Handbook, Feb. 2006, <https://www.cu.edu/psc/purchasing/procurementcard/handbooks/Proc-CardProgramHandbook.pdf>.

Purchasing Card Program Overview, Apr. 12, 2006, < http://www.cicu.org/CMT/memberServices/2JPMorgan.ppt#256,1,Slide 1>.

Office Action from U.S. Appl. No. 12/572,931 mailed Oct. 16, 2012.

Office Action dated Jan. 30, 2014 for U.S. Appl. No. 12/572,931.

* cited by examiner

VIRTUOUS CYCLE BUSINESS GROWTH

FIELD OF THE INVENTION

The present invention relates to systems and methods for providing insurance agents with goods and services aimed at fueling profitable growth. More particularly, the invention relates to methods and systems that allow for managing a resource system for agents by selecting resources, centralizing resources, giving the agents a method of buying resources, and providing funds to purchase resources based on the agents' performance.

BACKGROUND

An insurance company often has agent(s) who sell the insurance company's products. These agents may not be employed by the insurance company and may be contracted to perform certain agent services and to write business exclusively for the insurance company. In other instances, the agents may not exclusively sell the insurance company's products but may dedicate a portion of their business to selling the insurance company's products.

The present invention in part involves making various resources available to the agents.

SUMMARY

Aspects of the present invention provide systems and methods that allow agents to access products and services useful in growing, branding and managing their business at a centralized location. Moreover, aspects of the present invention provide systems and methods for creating a virtuous cycle for business performance, whereby funds for purchasing goods and services awarded to agents may be linked to the agents' performance. This method of rewarding performance by granting funds to be used towards purchasing products may create a reinforcing feedback loop that rewards good performance with funds that may be used to create further improvements in business performance. Aspects of the invention may make it easier for the agents to sell the insurance company's products and/or to allow the agents to brand, grow, or manage their business with respect to the insurance company. In one embodiment of the invention, a system provides and manages funds awarded to an agent by determining an amount of funds to be granted to an agent, determining purchasing restrictions for the funds and tracking the funds remaining based on the products or services purchased by the agent using the awarded funds. In some embodiments, the system may determine restrictions based on merchant category codes (MCCs), specific merchants, and/or stock-keeping unit codes (SKUs). In other embodiments, restrictions may be placed as to when the funds may be used. For example, in some embodiments, funds may only be available after a certain date, for a certain date range or from date of issue until some date in the future. Some embodiments of the invention provide a system for allocating, managing and displaying information relating to the performance, awards funds, and use of funds by an agent.

In other embodiments of the invention, a declining balance card or a system of declining balance cards is provided, where the declining balance card(s) may be restricted based on a variety of factors related to limiting the agent's purchases using the declining balance card(s) to goods and services that will assist the agent in branding, growing and managing the agent's business. The restrictions may be based on merchant category codes (MCCs), specific merchants, stock-keeping unit codes (SKUs), and/or dates. In still other embodiments of the present invention, methods for managing funds awarded to agents are presented. Aspects of the method may allocate funds for use by an agent based on the agent's performance, determine restrictions on the use of the funds limiting purchases to goods and services that assist in the growth, branding, or managing of the agent's business, and apply the funds and the restrictions to declining balance card(s).

In certain embodiments of the invention, the present invention can be partially or wholly implemented with a computer-readable medium, for example, by storing computer-executable instructions or modules, or by utilizing computer-readable data structures.

The methods and systems of the above-referenced embodiments may also include other additional elements, steps, computer-executable instructions, or computer-readable data structures.

The details of these and other embodiments of the present invention are set forth in the accompanying drawings and the description below. Other features and advantages of the invention will be apparent from the description and drawings, and from the claims.

BRIEF DESCRIPTION OF THE DRAWINGS

The present invention may take physical form in certain parts and steps, embodiments of which will be described in detail in the following description and illustrated in the accompanying drawings that form a part hereof, wherein.

DETAILED DESCRIPTION

Exemplary Operating Environment

Figure 1A:
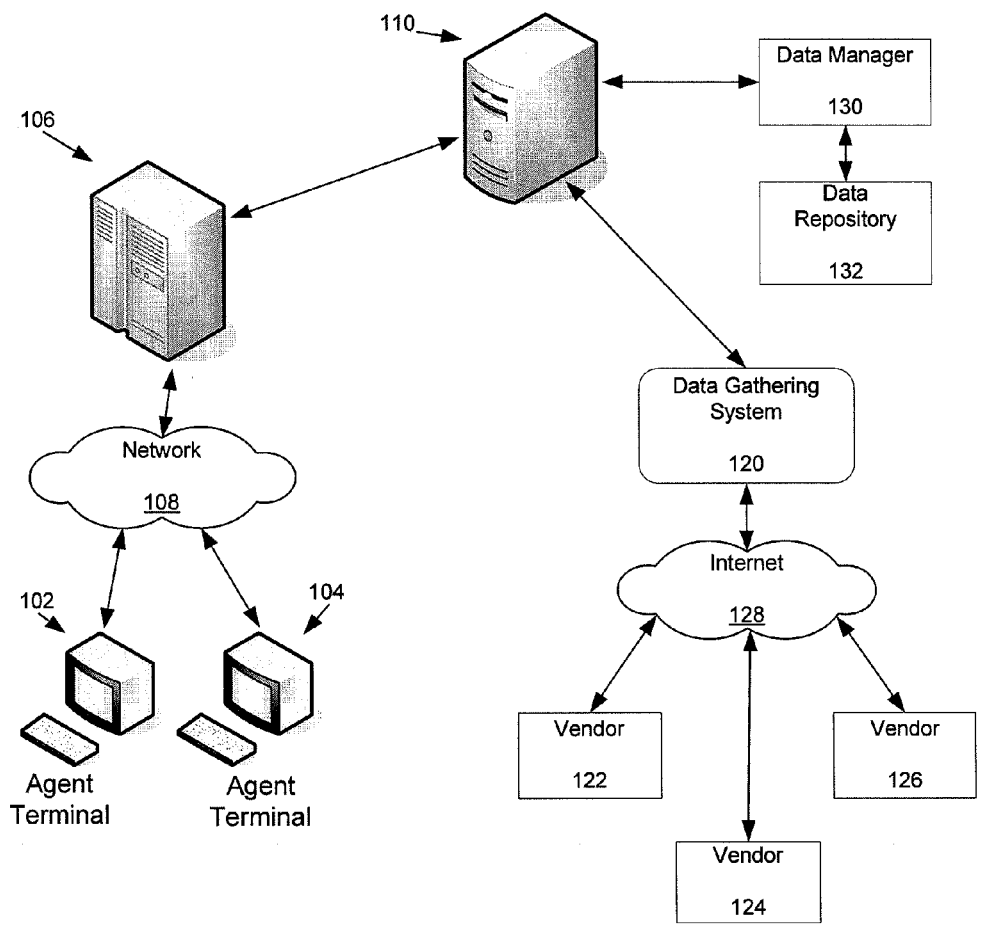
FIG. 1A shows a diagram of a computer system that may be used to implement aspects of the invention.

FIG. 1A shows a diagram of a computer system that may be used to implement aspects of the invention. A plurality of agent terminals, such as terminals 102 and 104, may be coupled to an insurance company computer 106, via a network 108. Insurance company computer 106 may be coupled to a transaction manager computer 110, which is described in detail below. Insurance company computer 106 provides agents with a user interface on agent terminals 102 and 104 for displaying goods and services available to the agents, as well as other information or business strategies relevant to conducting business related to selling agency's products including, for example, prospecting, telemarketing, cross-selling, lead generation, customer experience, education, and supply management. Moreover, insurance company computer 106 enables the agents to interact with server or transaction manager computer 110.

Terminals 102 and 104 may require information from external data sources to determine goods and services available for purchase or conducting other agency-related business. Requests for such information may be transmitted via transaction manager computer 110 to a data gathering system 120. Data gathering system 120 may include a processor, memory and other conventional computer components and may be programmed with computer-executable instructions to communicate with other computer devices. Data gathering system 120 may access external sources of information, such as vendors 122, 124 and 126 via the Internet 128, or other suitable network. Vendors may include various entities that may provide myriad goods and services that will help the agent improve its branding, growth and management of its agency-related business.

Transaction manager 110 may be programmed with computer-executable instructions to receive requests for data from terminals 102 and 104, format the requests and transmit the requests to data gathering system 120. In one embodiment of the invention, requests for data are in the form of documents that are in extensible markup language (XML) format. Transaction manager 110 may also be coupled to a data manager computer device 130 that accesses data stored in a data repository 132. In some embodiments, data stored in data repository 132 may be related to the specific agent including, for example, past performance information, order history, purchase history, and other specific agent data. Data repository 132 may be implemented with a group of networked server computers or other storage devices. In some embodiments, data repository 132 may be integrated with data manager 130 and/or transaction manager 110. Data repository 132 may be a database or other means of storing data.

Figure 1B:
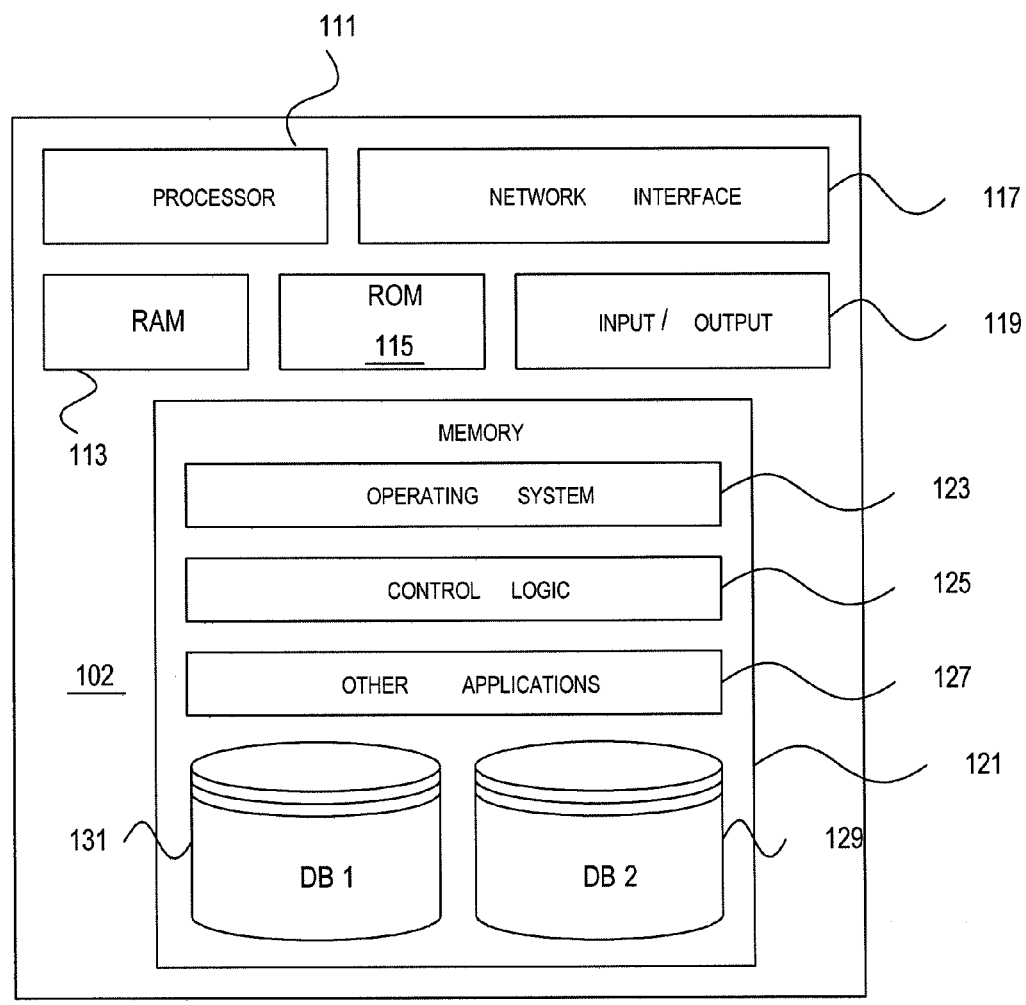
FIG. 1B shows an exemplary computer in accordance with some embodiments of the invention.

Insurance company computer 106 may provide agents with a user interface on terminals 102 and 104 for displaying goods and services available for purchase as well as other agency-related business information such as customer lists, telemarketing information, educational information, and other agency-related information. Insurance company computer 106 may also enable agents to interact with transaction manager 110. In an embodiment, agents may also obtain information without the use of terminals 102 and 104. For example, an agent may use a computer device that is connected to insurance company computer 106 and/or data solutions transaction manager 110 via the Internet. Terminal 102 (and each other component in the system) may be any type of known computer, server, or data processing device. The structure of such an exemplary device in some embodiments is depicted in FIG. 1B.

Terminal 102 may include a processor 111 controlling overall operation of terminal 102. Other terminals may also include processors. Terminal 102, similar to other terminals, may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of terminal 102, control logic 125 for instructing terminal 102 to perform aspects of the invention as described herein, and other application software 127 providing secondary, support, and/or other functionality which may or may not be used in conjunction with aspects of the present invention. The control logic may also be referred to herein as the terminal software 125. Functionality of the terminal software may refer to operations or decisions made automatically based on rules coded into the control logic, made manually by a user providing input into the system, and/or a combination of automatic processing based on user input (such as queries, data updates, data deletes and other similar data manipulation requests).

Memory 121 may also store data used in performance of one or more aspects of the invention, including a first database 131 and a second database 129. In some embodiments, the first database may include the second database (such as a separate table, report, other structure or as part of the first database). That is, the information can be stored in a single database, or separated into any number of different logical, virtual, or physical databases, depending on system design. Those of skill in the art will appreciate that the functionality of terminal 102 (or devices 104, 106, 110, 120, other structure or as part of the first database) as described herein may be spread across multiple data processing devices, for example, to distribute processing load across multiple computers, to segregate transactions based on geographic location, user access level, quality of service (QoS), or other factors.

The agent's computer device may use a user interface that allows the agent to perform some or all of the same functions described with respect to terminals 102 and 104. In other embodiments, an agent may access information relating to goods and services available for purchase through receipt of a brochure or other document via email, fax or mail.

One or more of the computer devices and terminals shown in FIG. 1A may include a variety of interface units and drives for reading and writing data or files. One skilled in the art will appreciate that networks 108 and 128 are for illustration purposes and may be replaced with fewer or additional computer networks. One or more networks may be in the form of a local area network (LAN) that has one or more of the well-known LAN topologies and may use a variety of different protocols, such as Ethernet. One or more of the networks may be in the form of a wide area network (WAN), such as the Internet. Computer devices and other devices may be connected to one or more of the networks via twisted pair wires, coaxial cable, fiber optics, radio waves or other media.

The term "network" as used herein and depicted in the drawings should be broadly interpreted to include not only systems in which remote storage devices are coupled together via one or more communication paths, but also stand-alone devices that may be coupled, from time to time, to such systems that have storage capability. Consequently, the term "network" includes not only a "physical network" but also a "content network," which is comprised of the data—attributable to a single entity—which resides across all physical networks.

One or more aspects of the invention may be embodied in computer-usable or readable data and/or computer-executable instructions, such as in one or more program modules, executed by one or more computers or other devices as described herein. Generally, program modules include routines, programs, objects, components, data structures, and other portions of software and/or firmware that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, or other computer readable media. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and other firmware or hardware. Particular data structures may be used to more effectively implement one or more aspects of the invention, and such data structures are contemplated within the scope of computer executable instructions and computer-usable data described herein.

Exemplary Embodiments

Figure 2:
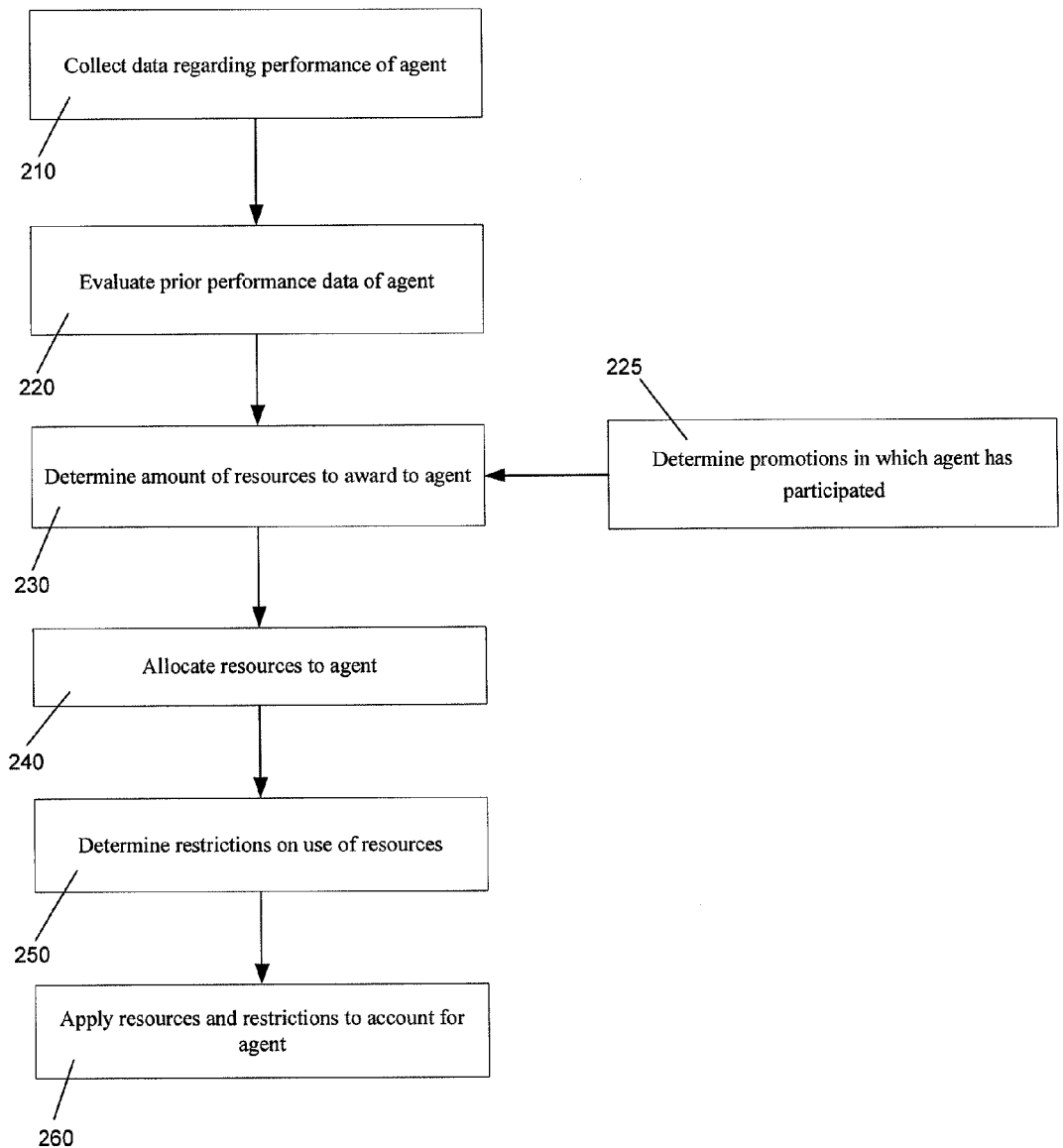
FIG. 2 illustrates a method of managing funds allocated to an agent in accordance with an embodiment of the invention.

FIG. 2 illustrates a method of managing funds allocated to an agent in accordance with an embodiment of the invention. In step 210, data may be collected regarding the performance of an agent. In some embodiments, step 210 may also include receiving data relating to the amount of funds available to the company to distribute to its agents. In step 220, the data of the performance of an agent during a certain time period may be evaluated. In some embodiments, the agent's performance may be evaluated based on the policies in force. The number of policies issued in a particular time frame (such as, for example, a year, six months, or one month) or the amount of premiums received in a particular time frame (such as, for example, a year, six months, or one month) related to policies issued by or related to an agent or an agent's agency. All of the data described above regarding polices is data that represents insurance policies. Other data that may be considered in the evaluation of the prior performance of an agent may include measurements of retention, growth, and profit. An example of a measurement of retention may be a comparison of the actual retention of policies as compared to the goals or average for the agency. Measurement of growth may include the evaluation of the growth in policies from the prior year and/or new issued items for emerging business. Any of this data may be combined with each other or with other data to provide a quantitative analysis of each agent's performance.

In some embodiments the data relating to an agent's new business or retention may be evaluated based on a comparison of that agent's growth or retention as compared to the average growth or retention by agents throughout the company or within a particular region. Other embodiments may include the comparison of data of an agent's growth or retention with the expected growth or retention for agents within the company or within a region. Data related to retention can include, but is not limited to, data regarding the number of policies renewed in a particular time frame (such as, for example, a year, six months, or one month) or the length of time that policyholders maintain their policies or the average length of time that policyholders retain their policies where those policies were issued by or related to an agent or the agent's agency. Particular types of data regarding a particular agent or agency can be compared to similar types of data regarding other agents or agencies.

In certain embodiments, it is determined which promotions the agent has participated in that would potentially generate an additional award of funds in step 225. Examples of promotions that agents may participate in may include targeted sales of particular policies, sales of specific policies at discounted rates, enrollment of customers in particular plans or programs (e.g. automatic payment plans, auto club memberships, or other plans or programs), or any other incentivized sale or promotion. In step 230, the amount of funds to be awarded to the agent may be determined. In one embodiment, the amount of funds may be determined by multiplying the performance data of the agent evaluated in step 220 by some dollar amount, where the dollar amount may vary based on various factors about the agency and the insurance company. Factors that may contribute to determining the amount assigned to an agent may include the size of the agency, the location of the agency, the market that the agency is targeting, the total amount of funds that the insurance company may distribute across all agents and agencies, and other factors that may affect sales and goals for the agency or the company.

After the amount of the funds to be awarded to the agent has been determined in step 230, the funds may be allocated to the agent in step 240. The allocation of funds may set aside a certain amount of funds that the agent may use to purchase goods and/or services to continue to grow or improve his or her business. In step 250, restrictions on the use of the funds may be determined. In some embodiments, the restrictions may limit the use of the funds to goods and services that will help the agent to brand, grow or manage their business. In other embodiments, the restrictions may limit the use of the funds to goods and services that support the business, such as computers, telephony equipment, and other support goods and services. This may provide a cyclical symbiotic relationship such that the more the agent grows their business, the more funds the agent is awarded by the insurance company, thus providing additional funds for the agent to grow or improve his or her business. Restrictions also may be based on limiting the purchase of products or services to those products or services that have been determined to meet superior performance characteristics such as being at or above a certain quality level, at or below a certain price, reliably available, consistent, and other superior performance characteristics.

Finally, in step 260, the funds and restrictions may be applied to an account for the agent. In one embodiment, the funds and restrictions may be applied to a declining balance card. In other embodiments, the funds and restrictions may be applied to an account stored on insurance company computer 106 or elsewhere. In still other embodiments, the funds and restrictions may be applied both to an account and to a declining balance card. In such embodiments, when a purchase transaction is made from or an addition is made to the declining balance or the account, the information may be stored in a central location accessible by both the account and the card so that the information may be available to both the account and the card.

The allocation of funds in this process may be different for agents with similar performance characteristics if the agents are in different regions, have different goals and expectations, or are differently situated based on other factors. Additionally, the allocation of funds may allow the insurance company to distribute funds in a manner where the highest performing agents receive more of the funds to be used for branding, retaining and growing their business, while lower performing agents may receive less of the funds available. This uneven allocation of funds may allow the insurance company to credit those agents that operate at higher performance levels and/or have bigger books of business than those agents who operate at lower performance levels and/or have smaller books of business.

Agents may have information available to them concerning how funds are generally allocated and providing feedback as to how the agency is performing. Various reports may be generated and available to provide each agent with information relating to the evaluation score that each agent will receive at the end of a cycle and the level at which the agent is performing, or other reports on agent spending or performance. These reports may be generated manually or using computers or computer systems. The reports may be shown as a graphical display on a graphical user interface. Exemplary computers and computer systems may be similar to those described with respect to FIG. 1A and FIG. 1B.

In one embodiment of the invention, the steps are completely automated based on data received in the insurance company's system and stored in a database. In other embodiments, certain steps may be done manually. For example, in some embodiments, evaluating the performance of an agent may be done by the insurance company based on many factors and data, some of which may not be quantifiable and therefore less useful in an automated evaluation process. One skilled in the art will appreciate that FIG. 2 shows an exemplary method that may be used to determine and apply a fund award amount and set of restrictions. A variety of other methods may be used within the scope of this invention.

Figure 3A:
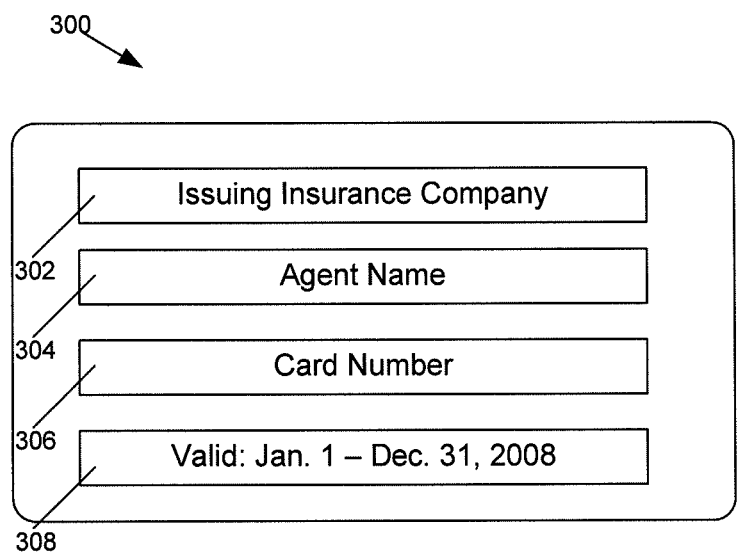
FIGS. 3A and 3B illustrate elements of a declining balance card in accordance with certain aspects of the invention.
Figure 3B:
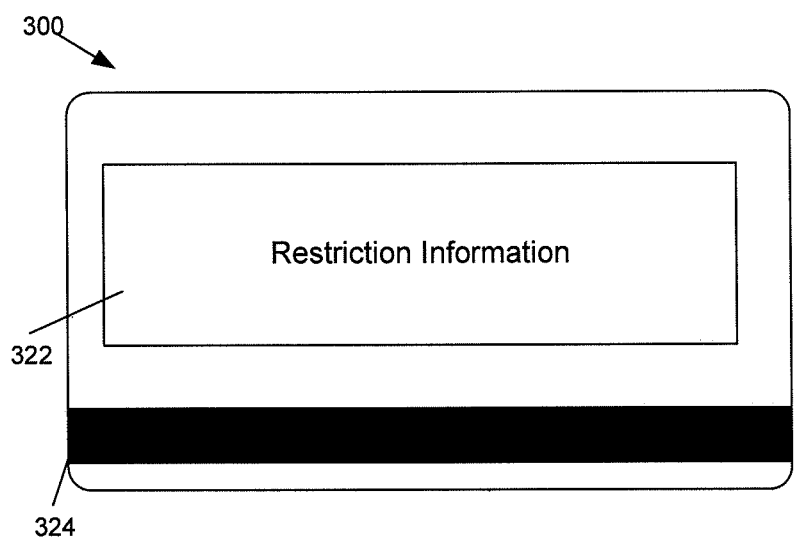

FIG. 3A illustrates the front of an exemplary declining balance card and FIG. 3B illustrates the back of an exemplary declining balance card that may be used in certain aspects of the invention. As depicted in FIG. 3A, declining balance card 300 may include information identifying the name 302, logo, and other information of the company issuing the declining balance card 300 (in this exemplary illustration, the name of an insurance company issuing the card to an agent may be shown). Other elements that may be a part of the declining balance card 300 include the name of the agent 304 receiving the declining balance card 300, the unique card number 306, which identifies the declining balance card 300, and a valid date range 308, which identifies the dates during which the declining balance card 300 may be used. Declining balance card 300 may also include a magnetic strip 324. Magnetic strip 324 may be similar to that of debit or credit cards and may include any information that should be stored on declining balance card 300. The magnetic strip may be a data storage device capable of storing information including the balance, the date restrictions and other restrictions on use of card 300, the agent to whom the card is issued, a unique identifying number of the card (or account that the card is associated with), and other information. Another element that may be included on declining balance card 300 is a restriction information section 322, identifying the restrictions on card 300. This section may be duplicative of the information stored in magnetic strip 324, but may be provided so that a user of card 300 understands the restrictions prior to trying to use card 300.

Figure 4:
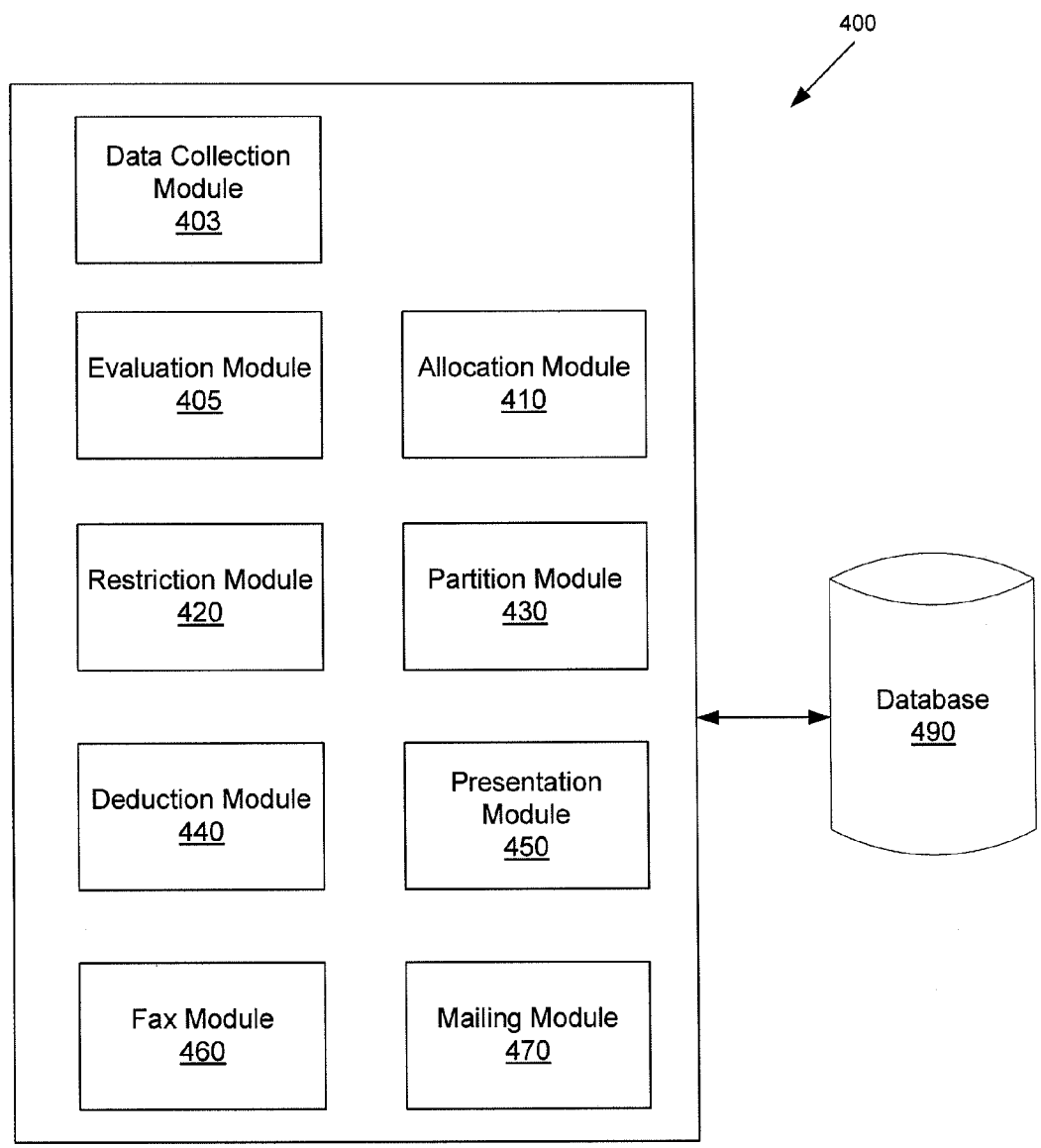
FIG. 4 illustrates various modules of a system in accordance with certain aspects of the invention.

FIG. 4 depicts an exemplary embodiment of a system 400 that may be used to implement various aspects of the invention. As seen in FIG. 4, system 400 may include multiple modules (403-470) and may optionally include Database 490 for storing data. For example, FIG. 4 depicts a Data Collection Module 403 that may collect data regarding an agent's performance and purchase history data and an Evaluation Module 405 that may evaluate and/or analyze the prior performance of an agent using various factors and the purchases made and attempted by an agent. In some embodiments, there may be a default performance assigned to new agents, which may be stored in Database 490. In certain embodiments, the Evaluation Module 405 may require user-input based on various non-quantifiable criteria. In other embodiments, the evaluation may be fully-automated. In certain embodiments, the system may also include an Allocation Module 410. Allocation Module 410 may allocate the funds determined by Evaluation Module 405 to an account or declining balance card for an agent. In some embodiments, Allocation Module 410 may allocate funds based on an agent's participation in certain promotions or based on other criteria. In certain embodiments, Restriction Module 420 may determine certain limitations regarding how the agent may use the allocated funds.

Some embodiments may include a Partition Module 430, which may partition the allocated funds into different fund portions. Partition Module 430 may use a variety of factors to determine how funds are partitioned. For example, in at least one embodiment, Partition Module 430 may partition the funds such that one fund partition may only be used for one set of MCCs, while another partition may be used for another set of MCCs. In other embodiments, the partitions may be based on specific merchants, dates of usage, SKUs, business strategies, product types or uses, or any combination thereof. Deduction Module 440 may deduct from the agent's current funds an amount equal to the value of goods or services purchased.

Each of the modules may work with Database 490 to modify data and data structures to carry out the tasks relevant to each respective module. For example, Deduction Module 440 may modify data relating to an account balance in a data structure residing in Database 490, which maintains information regarding the relevant account. Similarly, Partition Module 430 may modify data in the same data structure or another data structure to delineate portions of the funds in an account to be used for specific products, for specific types of products, for certain business strategies (growth, branding, other business strategies), at a specific vendor, and other restrictions. A list of approved vendors, products, merchant categories, and other information may be maintained in a database identifying those that are approved and fall within the desired criteria. Alternatively, a list of restricted vendors, products, merchant categories, and other information may be maintained in a database identifying those that are restricted and fall outside the desired criteria. Data Collection Module 403 may collect agent performance data, agent purchase data, or any other data and store the data in memory, such as Database 490.

In some embodiments, system 400 may include a Presentation Module 450, which may present information to an agent. Presentation Module 450 may be capable of presenting different information to the agent including, for example, a list of goods and services that can be purchased using the funds allocated to the agent. Other exemplary types of information that Presentation Module 450 may be capable of presenting include information relating to prospecting, telemarketing, cross-selling, lead generation, customer experience, education, and supply management, and other information. In embodiments containing a Presentation Module 450, system 400 may also include Fax Module 460 and/or Mailing Module 470. Fax Module 460 may be capable of taking information that Presentation Module 450 generates to be displayed to an agent through a graphical user interface or other display device and generating a fax of that information to be sent to the agent. Fax Module 460 may also automatically fax the information to the agent. Alternative to, or in conjunction with, Fax Module 460, system 400 may include Mailing Module 470, which may be capable of taking information that Presentation Module 450 generates to be displayed to an agent and generating a mailing of that information to be sent to the agent. Mailing Module 470 may also automatically print the mailing and envelope and pack the envelope with the mailing so that the package is read to be sent to the agent.

Another aspect of the invention may allow for the use of the agent's own funds in addition to, or instead of, the funds allocated to the agent by the insurance company.

In some embodiments, the system may include a variety of databases and processors and displays. For example, in some embodiments, each type of data may be stored in a unique database and each manipulation and/or transformation of information or data may be executed by a unique processor. In other embodiments, all data may be stored in a single database or any number of databases that may separate where data is physically or logically stored in any method understood by one of skill in the art with respect to data and database management. In some embodiments, each processor identified may be a unique processor while in other embodiments any of the identified processors may be combined with any other identified processor into one or more processors. Moreover, any number of processors may be present to perform the necessary actions as identified in the claims.

In one embodiment, the system may include an agent account used to store funds allocated to the insurance agent. Additionally, the system may include an agent performance database used for storing information relating to the performance of agents. Examples of the types of data that may be stored in the agent performance database may include: the number of policies issued by an agent, which may be broken down by time frames during which the policies were issued; the number of policies issued by an agent that have been renewed, which also may be broken down by time frames during which the policies were issued and/or renewed; the number of policies issued by a subset of a group of agents, which may be broken down by time frames during which the policies were issued; the number of policies issued by a subset of a group of agents that have been renewed, which also may be broken down by time frames during which the policies were issued and/or renewed; and other criteria identifying the performance of the agent in an absolute sense or with respect to other agents.

In some embodiments, the system may also include a first fund allocation database and a second fund allocation database. Each of the fund allocation databases may include data that represents the total amount of funds that an insurance company may wish to distribute to groups of its agents at two different times and/or for two different purposes. In some embodiments, there may be a first group of agents relevant to a first time period or activity and a second group of agents for a second time period or activity. In some embodiments there may be any number of groups that are identified with respect to various times or activities. In certain embodiments, some of the separately identified groups of agents may be distinct from each other and some groups may be identical. At the extremes, in certain embodiments, there may be only one group where multiple groups are identified at one extreme and there may be as many distinct groups as there are groups identified at the other extreme. In certain embodiments including a first fund allocation database and a second allocation database, the two databases may be implemented by using a single database.

In some embodiments, the system may include a first fund allocation processor, which may allocate some portion of the funds that the insurance company wishes to distribute to one of the agents. The first fund allocation processor may receive data from the various databases already identified and evaluate and manipulate the data to determine the amount of funds to be allocated to one of the agents. The first fund allocation processor may also transmit information to the agent representing these funds. In some embodiments, the transmission may result in an increase in the funds available to the agent in the agent account.

In other embodiments, the system may include a second fund allocation processor that may allocate a second amount of funds to the agent. As with certain other aspects of the system, the second fund allocation processor may be implemented with the first fund allocation processor as a single processor. The second allocation of funds may be determined by using the information used by the first fund allocation processor. Additionally, the second fund allocation processor may determine the second amount of funds to be allocated by further considering activity of the agent or other agents since receiving the first allocated funds. For example, in one embodiment, the system may evaluate how the first funds were used by the agent, how a plurality of agents that may or may not include the agent at issue used the first allocated funds, and/or whether the first agent and/or other agents or a plurality of agents attempted to use the first allocated funds for unauthorized purposes. In some embodiments, the data relating to how the agent, other agents, or a plurality of agents used the first allocated funds may be stored in an agent purchases database. Additionally, an agent improper purchase attempt database may store data relating to attempts by the agent or other agents to use the first allocated funds for unauthorized purposes. The second fund allocation processor may then transmit information to the agent representing the second amount of funds. In some embodiments, the transmission may result in an increase in the funds available to the agent in the agent account.

Some embodiments of the invention may also include a vendor database and a goods database. The vendor database may store information relating to merchants or vendors that have been identified as authorized retailers to accept the allocated funds. The goods database may store information relating to goods or services that have been identified as goods or services that an agent is authorized to purchase using the allocated funds. These databases may be related or integrated and, in some embodiments, may identify particular goods in conjunction with particular vendors that are authorized. Alternatively, or in addition, in some embodiments, the databases may store categories or specific vendors that are specifically excluded from the list of authorized vendors and/or goods.

In certain embodiments, the system may also include a fund restriction processor that may place limits on the use of allocated funds. In conjunction with the goods database, the vendor database, and/or any other data identifying dates, times, products, vendors, or other limitations on the use of allocated funds, the fund restriction processor may place restrictions on the use of the allocated funds. In embodiments where a declining balance card is used, these limitations may be placed on the card itself, either through the magnetic strip or any other known means. Additionally, or alternatively, restrictions may be placed on the agent account itself, such that the account funds may not be authorized for purchases that fall outside of the authorized purchase guidelines (or within restricted purchase guidelines) established by the fund restriction processor. In some embodiments the system may include a partition processor that partitions funds allocated to an agent into a number of fund partitions. The different fund partitions may allow for funds to be allocated to distinct goods or services and/or distinct types of goods and services.

The system may include any number of user displays. In one embodiment, the system may include an agent account graphical user display that may be capable of displaying the amount of funds in the agent account. In other embodiments, the system may include an agent purchase graphical user interface that may be capable of displaying data relating to an agent's purchase history. The user displays may be used by agents, individuals associated with an insurance company or other individuals and may be any known form of sending data, including sending the data to a web browser to be displayed, using custom applications, or sending the data to a printer, fax machine, or other device capable of displaying the information collected.

Illustrative Embodiment

The following example of an illustrative embodiment is not meant to limit the scope of the invention, but merely to provide a more concrete example of how a method or system using aspects of the present may function.

An insurance company may evaluate the performance of its agents by using a variety of factors. The insurance company may receive the various data that the evaluation will be based upon and store the data in a database. One factor that may be used to evaluate performance may be an agent's total value of policies in force at the end of each cycle (e.g., month, quarter, fiscal year, calendar year). The insurance company may also choose to measure the growth and profit of the agency as part of the evaluation of the performance of the agent as well. Upon evaluating performance of the agent, the insurance company may determine that—based on the location of the agent, the demographics of the policyholders, the potential for growth of the region, or other factors—a certain value of funds should be allocated to the agent for use in continuing to grow, manage, or brand the agent's business. After determining the amount to allocate to an agent, the insurance company may allocate those funds in a variety of ways including, for example, dispensing the funds into an account. The account may have a declining balance card associated with the account. This may include modifying data structures having data relating to an account balance or a limit on a declining balance card. Alternatively, the insurance company may simply designate a limit for an agent and, working with a bank, issue a declining balance card to the agent. The declining balance card may act like a credit card with a credit limit equal to the balance of funds available to the agent. As the agent spends the funds, the balance (the limit of the declining balance card) may be reduced accordingly.

The insurance company may be able to maintain control over the funds allocated to the agent in a variety of ways, including apportioning certain parts of the allocated funds for specific uses and restricting the use of funds to certain merchants and/or products. In the illustrative embodiment described here, the insurance company may choose to partition the funds into three separate portions: a growth portion, a management portion, and a branding portion. For example, if the insurance company determines that a total of $10,000 should be allocated to the agent and that the region that the agent services has been targeted with advertising, the insurance company may partition the funds into a $2,000 portion that may be used for managing the agent's business, a $2,000 portion that may be used for growing the agent's business, and a $6,000 portion that may be used for branding the agent's business. A partition processor may be used to partition funds into separate portions and may partition funds based on information regarding an allocation of funds as a percentage or a set dollar amount of total allocated funds or based on other information or determinations.

In some instances, where the agent accesses the allocated funds using a declining balance card, the insurance company may work with a bank to issue and manage the declining balance card. In some of those embodiments, the declining balance card may operate on the current credit card network, using certain features and advantages of the existing network. One example of how an insurance company may restrict use of the allocated funds through the use of a declining balance card may be to provide a list of authorized vendors. Any combination of an authorized vendor list, an unauthorized vendor list, an authorized and/or unauthorized merchant category code list, an authorized and/or unauthorized bank identification number ("BIN") list, an authorized and/or unauthorized SKU list, or other type of authorization may be used to restrain use of the allocated funds. In instances where such lists may be used, the lists may need to be maintained and updated by the insurance company in order to ensure that the lists accurately reflect any changes by vendors or the program goals. These lists may be stored in a variety of manners, including as data elements in a database. In alternative embodiments, vendor lists or MCC lists may be provided to a bank to limit authorization of transactions while the insurance company may further restrict the use of allocated funds by working with the vendors to set up limitations on certain items that may be purchased. Additionally, the insurance company may desire to stop funds for certain agents for various reasons (agency relationship terminated, investigation of use of certain funds, or other reasons). In some embodiments, the insurance company may be able to freeze access to these funds in a variety of ways. For example, the insurance company may be able to immediately place a hold on the funds in the agent's account by working with the bank to (temporarily or permanently) decline transactions and/or expire the card. The insurance company may retrieve the card from the agent.

The insurance company may further restrict usage of the allocated funds by limiting where the funds can be spent and what the funds can be spent on. In this example, the insurance company may determine that the $2,000 portion of the funds allocated for managing the agent's business may only be used on certain training seminars or software (or alternatively for certain training service providers or software providers). Additionally, the $2,000 portion of the funds allocated for growing the business may be restricted to telemarketing products and services or customer retention products and services. Finally, the insurance company may restrict use of the $6,000 portion of the allocated funds to advertising services and company-branded products for the agency. As stated above, each of the restrictions may be based on limiting spending to certain merchants, MCCs, SKUs, and/or date ranges. Additionally, the restrictions may apply whether or not the funds are partitioned and the partitions may be based on the restrictions applied to each portion. However, the portions may not necessarily be divided specifically into categories related to growth, branding and management.

The insurance company may issue the declining balance card to the agent so that the agent may use the declining balance card as if it were a debit or credit card. The agent may use the funds allocated to him or her online or at a vendor's store. Once the agent decides on goods or services to be purchased, the agent may provide the declining balance card (or other information associated with the account, such as an account number and PIN) to the vendor. If there are sufficient funds allocated to the agent in any of the partitions (or combination of partitions) that may be used for purchasing the identified product from the identified vendor, the transaction for the goods or services may be approved.

In the present embodiment, the declining balance card may use the existing credit card networks. In such an embodiment, the transaction may be approved by a bank that has partnered with the insurance company to provide the declining balance card. In other embodiments, the bank may be an affiliate of the insurance company, wherein the affiliate bank may perform many of the banking functions for the insurance company and, potentially, for the insurance company's customers. Once the transaction has been approved, the bank may issue a statement to the insurance company. The bank may issue a statement to the insurance company on a purchase-by-purchase basis, or on a periodic basis. In this exemplary embodiment, the bank may issue a monthly statement to the insurance company similar to a statement that the company would receive for corporate credit cards issued to employees. For example, the bank may provide the insurance company with a monthly statement indicating what products or services were purchased by each account having activity that month. The statement may also provide a total amount of the goods or services purchased by all of the declining balance cardholders that are participating in the system. The insurance company may then transfer the necessary funds to the bank to cover the purchase of the items. In alternative embodiments where there is no intermediate bank, the insurance company may transfer funds directly to the vendor(s) of the goods and/or services. The insurance company would then deduct the same value of funds from the agent's declining balance card or allocated account funds, lowering the "limit" of the agent's declining balance card. If the agent has some funds available for purchasing the identified item from the identified vendor, but not enough to cover the entire purchase, the agent may use the available funds and pay the balance with his or her own funds.

In some embodiments, the agent or other person may access a web page provided by the insurer to obtain information regarding the agent's declining balance card program, approved vendors, approved goods and services, and other information. In certain embodiments, the agent may also be able to purchase approved goods and services through the web page. In some embodiments, instead of or in addition to purchasing goods and services through the insurance company's centralized web page, the agent may be able to go directly to an approved vendor's website or store to make purchases using the declining balance card or account containing the funds allocated to the agent. In certain embodiments, the agent may purchase the approved goods and/or services via telephone or by sending in orders via facsimile.

In other embodiments, once the agent has funds allocated, the agent may view the approved vendors and/or products and services available for purchase with the allocated funds. The agent may then purchase the products or services with his or her own funds and submit claims for reimbursement by providing a proof of purchase.

After the end of the next relevant period for evaluating the agent, the process may be repeated. The criteria for evaluating the performance of the agent may be adjusted if necessary and the determination of the amount of funds to be allocated may change depending on changes in the market, demographics, or other factors with respect to the region the agent services or based on agent purchases and/or purchase attempts, agent performance, agent behavior or other factors. The insurance company may collect data relating to purchases made by the agent during the previous period or purchases rejected during the previous period as well as data relating to the agent's performance data points from the most recent period and the prior period. The insurance company may then use evaluation criteria relating to a comparison of the agent's personal change in performance instead of, or in addition to, the agent's performance relative to the averages of all of the agents of the company. Additionally, the insurance company may evaluate the purchases made and the purchases attempted but rejected by the agent in the prior period to determine or modify the analysis of funds to be allocated and/or partitioned. In some cases, the company may choose to allocate fewer funds if unauthorized purchases were attempted or if more than a specified percentage (for example, 1%, 5%, 10%) of unauthorized purchases were attempted or if a specified number of unauthorized purchases were attempted, such as between one and ten; between one and three or no more than one. In other embodiments, the company may elect to partition a larger portion of the funds for a particular type of items (from certain vendors, certain SKUs, related to certain business strategies, etc.) if the agent spent those funds early in the period. Additionally, in some embodiments the company may elect to partition a smaller portion (or a larger portion) if the agent's growth excelled during the prior period. If there are no changes that alter the evaluation or allocation, the same set of evaluation factors may be used and the same calculation for funds to be allocated may be used.

If there are no date restrictions, the newly allocated funds may be added to the currently unspent funds. If there are different restrictions on the newly allocated funds, an additional partition may be created for these new funds. In other embodiments, a second declining balance card may be issued for a second period. Additionally, a new declining balance card may be issued for each period and each declining balance card may have its own expiration date. In some embodiments, a declining balance card may have a different expiration period than the expiration period of most credit cards. The expiration period may be any amount of time. In some embodiments, the expiration period may be 1 year, 15 months, 18 months, etc. In embodiments where new declining balance cards are issued on an annual basis and where a previously-issued card has an expiration period of 18 months, there may be funds available on two different cards for the agent for a period of approximately 6 months.

An embodiment of the invention involves a computer-readable medium with computer-executable instructions that, when executed, receive data regarding a total amount of funds to be distributed to a plurality of agents of an insurance company and a first set of agent performance data. The instructions, when executed, also evaluate the performance of one of the plurality of agents based on the first set of agent perfoimance data for the agent and based on a first set of factors during a first time period. Additionally, the instructions determine a first amount of funds to be allocated to the agent from the total amount of funds based on the performance evaluation. The instructions then modify a data structure including data associated with one of an account balance and a declining balance card limit provided for the agent to allocate the first determined amount of funds to the one of the account balance and the declining balance card limit. Additionally, in such an embodiment, the computer-executable instructions determine restrictions to be applied to the allocated funds, wherein the restrictions are based on at least one of merchant category codes (MCCs), merchant identities, stock-keeping unit codes (SKUs), and dates and wherein the determination is based on identifying merchants, goods and services that will assist in at least one of growing, branding and managing the agent's business. In this embodiment of the invention, the instructions receive purchase data related to purchases made by the agent during a second time period, wherein the second time period begins after the end of the first time period, analyze the purchase data, receive a second set of agent performance data, and re-evaluate the performance of the agent based on the second set of agent performance data and based on a second set of factors during the second time period and the analysis of the purchase data. The computer instructions, when executed, also determine a second amount of funds to be allocated to the agent and modify the data structure including data associated with one of the account balance and the declining balance card limit provided for the agent to allocate the second determined amount of funds to the one of the account balance and the declining balance card limit.

Another embodiment of the invention involves a computer-readable medium comprising computer-executable instructions that, when executed, evaluate the performance of an agent of an insurance company based on a first set of factors, determine an amount of funds to be allocated to the agent based on the performance evaluation, allocate the determined amount of funds to the agent, and determine restrictions to be applied to use by the agent of the allocated funds, wherein the restrictions are based on a data structure stored in a memory including stock-keeping unit codes (SKUs) of acceptable products and the determination is based on identifying goods and services that will assist in at least one of growing, branding and managing the agent's business. The instructions also modify a data storage device on a declining balance card to include restriction data regarding the restriction determination.

Another embodiment of the invention involves a computer system having a server, a data gathering system configured to collect data from a plurality of vendors regarding items available for purchase by an agent and purchases made by an agent, a data repository configured to store the collected data and data regarding an agent's business, a data manager connected to the data repository and the server configured to provide access to the data stored in the data repository, and an agency computer connected to the server, wherein the server is configured to communicate with the agency computer, the data manager, and the data gathering system and the server is configured to use the data regarding the agent's business to allocate funds to the agent to be used to purchase items from the plurality of vendors.

Another embodiment of the invention involves a system comprising various modules. The system has an evaluation module configured to evaluate the performance of an agent based on a first set of factors during a first time period and determine an amount of funds to be allocated to the agent from the total amount of funds based on the performance evaluation. The system also includes an allocation module configured to allocate the determined amount of funds to the agent, wherein the allocation of funds includes modifying data associated with one of an account balance and a declining balance card limit provided for the agent. The system has a partition module configured to partition the allocated funds into a plurality of portions and determine restrictions to be applied to each of the plurality of portions of the allocated funds, wherein the restrictions are based on at least one of merchant category codes (MCCs), merchant identities, stock-keeping unit codes (SKUs), and dates, wherein the determination is based on identifying merchants, goods and services that will assist in at least one of growing, branding and managing the agent's business, and wherein at least one of the plurality of portions of the allocated funds has different restrictions than restrictions applied to a second one of the plurality of portions of the allocated funds. This embodiment of the system also includes a deduction module configured to transfer at least a portion of the allocated funds to a vendor in response to the agent purchasing items, wherein the items purchased and the vendor are not restricted, and a data collection and storage module configured to receive and store data regarding the items purchased.

While the invention has been described with respect to specific examples including presently preferred modes of carrying out the invention, those skilled in the art will appreciate that there are numerous variations and permutations of the above-described systems and techniques that fall within the spirit and scope of the invention as set forth in the appended claims.

We claim:

1. A funds allocation, management and display system comprising:
   an agent performance database that includes data structures that represent insurance policies and information that includes both relative and absolute performance of one of a first plurality of agents, wherein the agent performance database further includes information related to promotions in which the one of the first plurality of agents has participated, wherein the promotions relate to sales of specific insurance policies at discounted rates and enrollment of customers in automatic payment plans and auto club memberships, wherein the promotions are used to determine an amount of funds to be allocated to each of the first plurality of agents;
   a first fund allocation database that includes data structures that represent a total amount of first funds to be allocated to the first plurality of agents;
   a first fund allocation processor that allocates a portion of the first funds at a first time to at least one of an agent account and a first declining balance card associated with the one of the first plurality of agents based on data received from the agent performance database and the first fund allocation database;
   a vendor database that includes data regarding a plurality of qualifying vendors; a goods database that includes data regarding a plurality of qualifying goods; an agent purchases database that includes a data structure that represents tangible goods purchased by the one of the first plurality of agents utilizing the portion of the allocated first funds;
   an agent improper purchase attempt database that includes a data structure that includes data regarding attempts by the one of the first plurality of agents to purchase products within the group consisting of products that are non-qualifying products and products provided by non-qualifying vendors;
   the first fund allocation processor further allocating a portion of second funds at a second time to at least one of the agent account and the first declining balance card based on a first data set that includes data received from the agent performance database, the second fund allocation database, the agent purchases database and the agent improper purchase attempt database, wherein the data received from the agent purchases database includes data regarding goods purchased by the one of the first plurality of agents utilizing the portion of the allocated first funds;
   a fund restriction processor that places restrictions on at least one of the first funds and the second funds based on data received from the vendor database regarding non-qualifying vendors and data received from the goods database regarding non-qualifying goods;
   an agent account graphical user display that displays the amount of at least one of the first funds and the second funds; and
   an agent purchase graphical user display that displays electronic information representing goods purchased by the one of the first plurality of agents.

2. The funds allocation, management and display system of claim 1,
   wherein placing restrictions on at least one of the first funds and the second funds comprises limiting purchase authorization to items that will assist in at least one of growing, branding and managing business associated with the one of the first plurality of agents.

3. The funds allocation, management and display system of claim 1, wherein
   placing restrictions on at least one of the first funds and the second funds comprises limiting purchase authorization to specific stock-keeping unit codes (SKUs).

4. The funds allocation, management and display system of claim 1, further
   comprising a partition processor that partitions at least one of the first funds and the second funds into a plurality of fund partitions.

5. A funds allocation, management and display system comprising:
   an agent account that holds agent funds associated with a first agent of a plurality of agents;

an agent performance database that includes data structures that represent one or more specific insurance items that detail both relative and absolute performance of the first agent, wherein the agent performance database further includes information related to promotions in which the first agent has participated, wherein the promotions relate to sales of specific insurance policies at discounted rates and enrollment of customers in automatic payment plans and auto club memberships, wherein the promotions are used to determine an amount of funds to be allocated to each of the first plurality of agents, wherein the specific insurance items are chosen from the group consisting of policies issued by the first agent during a first policy issuance time frame, policies issued by the first agent during a second policy issuance time frame, policies renewed during a first policy renewal time frame where the policies were issued by the first agent, policies renewed during a second policy renewal time frame where the policies were issued by the first agent, policies issued by the first plurality of agents during the first policy issuance time frame, policies issued by the first plurality of agents during the second policy issuance time frame, policies renewed during the first policy renewal time frame where the policies were issued by one of the first plurality of agents, and policies renewed during the second policy renewal time frame where the policies were issued by one of the first plurality of agents;

a first fund allocation database that includes data structures that represent first funds to be allocated to the first plurality of agents;

a first fund allocation processor that allocates a portion of the first funds to the agent account at a first time where the processor is configured to:

receive data regarding the first agent performance during a first time period;

receive data regarding the performance of the first plurality of agents;

receive data regarding the first funds to be allocated to the first plurality of agents at the first time;

manipulate the received data regarding the first agent performance, the performance of the first plurality of agents and the first funds to be allocated to determine the portion of the first funds to be allocated to the agent account; and create electronic information that represents the portion of the first funds; and transmit to the agent account the electronic information that represents the portion of the first funds; an agent purchases database that includes a data structure that represents tangible goods purchased by the first agent utilizing allocated funds and a data structure that represents tangible goods purchased by the first plurality of agents utilizing the first funds;

a vendor database that includes data regarding a plurality of qualifying vendors;

a goods database that includes data regarding a plurality of qualifying goods;

an agent improper purchase attempt database that includes a data structure that includes data regarding attempts by the first agent to purchase non-qualifying goods, a data structure that includes data regarding attempts by the first plurality of agents to purchase non-qualifying goods, a data structure that includes data regarding attempts by the first agent to purchase goods from non-qualifying vendors, and a data structure that includes data regarding attempts by the first plurality of agents to purchase goods from non-qualifying vendors;

the first fund allocation processor further allocating a portion of second funds to the agent account at a second time where the first fund allocation processor is further configured to:

receive data regarding the first agent performance during a second time period;

receive data regarding the performance of the first plurality of agents during the second time period;

receive data regarding tangible goods purchased by the first agent utilizing allocated first funds;

receive data regarding tangible goods purchased by the first plurality of agents utilizing the first funds allocated to the first plurality of agents;

receive data regarding attempts by the first agent to purchase non-qualifying goods and receive data regarding attempts by the first agent to purchase goods from non-qualifying vendors;

receive data regarding attempts by the first plurality of agents to purchase non-qualifying goods and receive data regarding attempts by the first plurality of agents to purchase goods from non-qualifying vendors;

receive data regarding the second funds to be allocated to the first plurality of agents at the second time;

manipulate the received data regarding the first agent performance, the performance of the first plurality of agents, the second funds to be allocated, the attempts by the first agent to purchase non-qualifying goods and the attempts by the first plurality of agents to purchase non-qualifying goods to determine the portion of the second funds to be allocated to the first agent and create electronic information that represents the second funds; and transmit to the agent account the electronic information that represents the portion of the second funds;

a fund restriction processor that places restrictions on at least one of the portion of the first funds and the second funds in the agent account where the fund restriction processor is configured to:

receive data regarding a proposed purchase of one or more tangible goods by the first agent;

receive data from the vendor database regarding the plurality of qualifying vendors;

receive data from the goods database regarding the plurality of qualifying goods;

manipulate the received data regarding the proposed purchase of one or more tangible goods to determine whether the one or more tangible goods is a qualifying good from a qualifying vendor; and transmit an authorization to authorize or not authorize purchase of the one or more tangible goods using funds in the agent account;

an agent account graphical user display that displays the amount of at least one of the portion of the first funds and the second funds in the agent account; and an agent purchase graphical user display that displays electronic information representing tangible goods purchased by the first agent.

6. A funds allocation, management and display system comprising:

a database including a plurality of data structures, the plurality of data structures representing:

insurance policies;

agent performance data that includes information related to both relative and absolute performance of a first agent of a plurality of agents, wherein the agent performance data further includes information related to promotions in which the first agent has participated, wherein the promotions relate to sales of specific insurance policies at discounted rates and enrollment of customers in automatic payment plans and auto club memberships, wherein the promotions are used to determine an amount of funds to be allocated to each of the plurality of agents;

first funds to be allocated to a plurality of agents; data regarding a plurality of qualifying vendors; data regarding a plurality of qualifying goods; and a processor operatively coupled to the database, the processor configured to execute computer readable instructions comprising:

retrieving the agent performance data from the database; retrieving the first funds from the database; allocating a portion of the first funds at a first time to one or more of the group consisting of an agent account and a first declining balance card based on the agent performance data and the first funds, wherein the agent account and the first declining balance card are associated with the first agent;

retrieving the data regarding the plurality of qualifying vendors from the database;

retrieving the data regarding the plurality of qualifying goods from the database;

placing restrictions on the first funds based on the data regarding the plurality of qualifying vendors and the data regarding the plurality of qualifying goods;

generating a graphical user display configured to display the allocated portion of the first funds in at least one of the agent account and the first declining balance card; and generating a graphical user display configured to display electronic information representing goods purchased by the first agent.

7. The funds allocation, management and display system of claim 6, wherein the database further includes data structures representing:

second funds to be allocated to the plurality of agents;

data regarding tangible goods purchased by the first agent utilizing allocated first funds;

data regarding attempts by the first agent to purchase goods that are not one of the plurality of qualifying goods and attempts by the first agent to purchase goods that are not goods provided by one of the plurality of qualifying vendors, and wherein the processor is further configured to execute computer-readable instructions comprising:

retrieving the second funds from the database;

retrieving the data regarding the tangible goods purchased by the first agent utilizing the portion of the first funds from the database;

retrieving the data regarding attempts by the first agent to purchase goods that are not one of the plurality of qualifying goods and attempts by the first agent to purchase goods that are not goods provided by one of the plurality of qualifying vendors from the database; and allocating a portion of the second funds at a second time to one or more of the group consisting of the agent account and the first declining balance card based on the agent performance data, the second funds, the data regarding the tangible goods purchased by the first agent utilizing the portion of the allocated first funds, and the data regarding attempts by the first agent to purchase goods that are not one of the plurality of qualifying goods and attempts by the first agent to purchase goods that are not goods provided by one of the plurality of qualifying vendors.

8. The funds allocation, management and display system of claim 7, wherein the database further includes data structures representing:

data regarding tangible goods purchased by the plurality of agents utilizing allocated funds; and data regarding attempts by the plurality of agents to purchase goods that are not one of the plurality of qualifying goods and that are not goods provided by one of the plurality of qualifying vendors, and wherein the processor is further configured to execute computer readable instructions comprising retrieving data regarding the tangible goods purchased by at least one of the plurality of agents utilizing the allocated first funds from the database, and wherein the allocating the portion of the second funds is further based on the data regarding the tangible goods purchased by at least one of the plurality of agents utilizing the allocated first funds and the data regarding the attempts made by at least one of the plurality of agents to purchase goods that are not one of the plurality of qualifying goods and attempts by at least one of the plurality of agents to purchase goods that are not goods provided by one of the plurality of qualifying vendors.

9. The funds allocation, management and display system of claim 6, wherein placing restrictions on the first funds in the agent account or the first declining balance card comprises limiting purchase authorization to items that will assist in at least one of growing, branding and managing the insurance agent's business.

10. The funds allocation, management and display system of claim 6, wherein placing restrictions on the first funds in the agent account or the first declining balance card comprises limiting purchase authorization to specific merchant category codes (MCCs).

11. The funds allocation, management and display system of claim 6, wherein placing restrictions on the first funds in the agent account or the first declining balance card comprises limiting purchase authorization to specific merchants.

12. The funds allocation, management and display system of claim 6, wherein placing restrictions on the first funds in the agent account or the first declining balance card comprises limiting purchase authorization to specific stock-keeping unit codes (SKUs).

13. The funds allocation, management and display system of claim 6, wherein placing restrictions on the first funds in the agent account or the first declining balance card comprises limiting purchase authorization to specific date ranges.

14. The funds allocation, management and display system of claim 6, wherein the processor is further configured to execute computer readable instructions comprising partitioning the first funds in the agent account or the first declining balance card into a plurality of fund partitions.

15. The funds allocation, management and display system of claim 14, wherein partitioning the first funds in the agent account or the first declining balance card is based on merchant category codes (MCCs).

16. The funds allocation, management and display system of claim 14, wherein partitioning the first funds in the agent account or the first declining balance card is based on merchants.

17. The funds allocation, management and display system of claim 14,
wherein partitioning the first funds in the agent account or the first declining balance card is based on stock keeping units (SKUs).

18. The funds allocation, management and display system of claim 14,
wherein partitioning the first funds in the agent account or the first declining balance card is based on business strategies.

19. The funds allocation, management and display system of claim 6,
wherein the processor is further configured to execute computer readable instructions comprising generating a graphical user interface configured to present to the first agent products available for purchase that will help the first agent in at least one of growing, branding and managing the first agent's business.

20. The funds allocation, management and display system of claim 6,
wherein the data structures representing insurance policies comprise data structures that represent one or more specific insurance policy items chosen from the group consisting of policies issued by the first agent during a first policy issuance time frame, policies issued by the first agent during a second policy issuance time frame, policies renewed during a first policy renewal time frame where the policies were issued by the first agent, and policies renewed during a second policy renewal time frame where the policies were issued by the first agent.

* * * * *